United States Patent

Yajima

Patent Number: 5,165,992
Date of Patent: Nov. 24, 1992

[54] HARD COATING FILM AND OPTICAL ELEMENTS HAVING SUCH COATING FILM

[75] Inventor: Eiichi Yajima, Fuchu, Japan

[73] Assignee: Hoya Corporation, Tokyo, Japan

[21] Appl. No.: 724,785

[22] Filed: Jul. 2, 1991

[51] Int. Cl.$^5$ .............................................. B32B 27/20
[52] U.S. Cl. ..................................... 428/328; 428/323; 428/447; 428/404
[58] Field of Search ................. 428/323, 328, 404, 447

[56] References Cited

U.S. PATENT DOCUMENTS

| | | | |
|---|---|---|---|
| 4,343,641 | 8/1982 | Scholes | 428/149 |
| 4,374,158 | 2/1983 | Taniguchi et al. | 427/162 |
| 4,571,365 | 2/1986 | Ashlock et al. | 428/412 |
| 4,632,527 | 12/1986 | Masso et al. | 428/922 |
| 4,702,773 | 10/1987 | Ashlock et al. | 428/412 |
| 4,765,729 | 8/1988 | Taniguchi | 428/328 |
| 4,855,180 | 8/1989 | Kawamura | 428/328 |
| 4,904,525 | 2/1990 | Taniguchi et al. | 428/328 |

Primary Examiner—Paul J. Thibodeau
Assistant Examiner—Mark Forman
Attorney, Agent, or Firm—Nixon & Vanderhye

[57] ABSTRACT

A hard coating film is disclosed which is formed by hardening a coating composition containing the following component A and/or component B and component C:

Component A:
an organosilicon compound or a hydrolyzate thereof, said organosilicon compound being represented by the formula (I):

$$(R^1)_a(R^3)_b Si(OR^2)_{4-(a+b)} \quad (I)$$

Component B:
an organosilicon compound or a hydrolyzate thereof, said organosilicon compound being represented by the formula (II):

$$(OX)_{3-a}-\underset{R^4_a}{Si}-Y-\underset{R^4_a}{Si}-(OX)_{3-a} \quad (II)$$

Component C:
fine particles of tin oxide having a particle size of 1 to 100 millimicrons and coated with fine particles of tungsten oxide.

The coating film is excellent in hot water resistance and transparency and finds particularly useful application to lenses for spectacles.

13 Claims, No Drawings

HARD COATING FILM AND OPTICAL ELEMENTS HAVING SUCH COATING FILM

BACKGROUND OF THE INVENTION

1. Field of the Invention

The present invention relates to hard coating film and optical elements having such coating film.

2. Description of the Prior Art

It is well known to form a hard coating film containing an organosilicon polymer on the surface of synthetic resin of high refractive index such as polyurethane resin and halogen-containing resin so as to improve scuff or mar resistance of the resin. It is also known to contain a particulate metal oxide of high refractive index in a hard coating film so as to inhibit formation of interference fringes on the synthetic resin of high refractive index having the hard coating film. As an example of the proposals to contain a particulate metal oxide of high refractive index in a hard coating film, Japanese Patent Publication No. 63-37142 discloses a hard coating film formed from a coating composition containing an organosilicon compound and a particulate tin oxide having an average particle size of 1 to 300 millimicrons.

The coating composition containing fine particles of tin oxide and an organosilicon compound disclosed in said Japanese patent publication, however, had the problem that said coating composition is difficult to treat or handle, because of the cohesive inclination or coagulation of the fine particles of tin oxide since the tin oxide particles are in a state of being charged positively while the organosilicon compound is in a state of being charged negatively in the composition.

SUMMARY OF THE INVENTION

The present invention has been made for eliminating said problems of the prior art, and it is intended to provide a hard coating film made from a coating composition containing fine particles of tin oxide which have been made scarcely cohesive to each other without affecting the specific properties of tin oxide, and optical elements having such a hard coating film.

According to this invention which can attain said object, a hard coating film is provided by hardening a coating composition containing the following component A and/or component B and component C:

Component A:

an organosilicon compound or a hydrolyzate thereof, said organosilicon compound being represented by the formula (I):

wherein $R^1$ and $R^3$ are each an organic group containing therein at least one members selected from the group consisting of alkyl group, alkenyl group, aryl group, acyl group, halogen group, glycidoxy group, epoxy group, amino group, mercapto group, methacryloxy group and cyano group; $R^2$ is a member selected from the group consisting of alkyl group having 1 to 8 carbon atoms, alkoxyl group having 1 to 8 carbon atoms, acyl group having 1 to 8 carbon atoms and phenyl group; and a and b are each an integer of 0 or 1;

Component B:

an organosilicon compound or a hydrolyzate thereof, said organosilicon compound being represented by the formula (II):

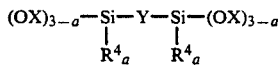

wherein $R^4$ is an organic group having 1 to 5 carbon atoms; X is an alkyl group having 1 to 4 carbon atoms or an acyl group having 1 to 4 carbon atoms; Y is an organic group having 2 to 20 carbon atoms; and a is an integer of 0 or 1;

Component C:

fine particles of tin oxide having a particle size of 1 to 100 millimicrons and coated with fine particles of tungsten oxide.

Further, the optical elements according to this invention which can attain said object comprises a base material and a hard coating film provided thereon, said hard coating film being formed by hardening a coating composition containing the following component A and/or component B and component C:

Component A:

an organosilicon compound or hydrolyzate thereof, said organosilicon compound being represented by the formula (I):

wherein $R^1$ and $R^3$ are each an organic group containing therein at least one members selected from the group consisting of alkyl group, alkenyl group, aryl group, acyl group, halogen group, glycidoxy group, epoxy group, amino group, mercapto group, methacryloxy group and cyano group; $R^2$ is a member selected from the group consisting of alkyl group having 1 to 8 carbon atoms, alkoxyl group having 1 to 8 carbon atoms, acyl group having 1 to 8 carbon atoms and phenyl group; and a and b are each an integer of 0 or 1;

Component B:

an organosilicon compound or a hydrolyzate thereof, said organosilicon compound being represented by the formula (II):

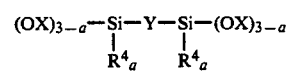

wherein $R^4$ is an organic group having 1 to 5 carbon atoms; X is an alkyl group having 1 to 4 carbon atoms or an acyl group having 1 to 4 carbon atoms; Y is an organic group having 2 to 20 carbon atoms; and a is an integer of 0 or 1;

Component C:

fine particles of tin oxide having a particle size of 1 to 100 millimicrons and coated with fine particles of tungsten oxide.

DETAILED DESCRIPTION OF THE INVENTION

The present invention will be described in detail below.

As examples of the organosilicon compounds represented by the formula (I), or the hydrolyzates thereof, usable as component A in the present invention, there can be mentioned trialkoxysilanes and triacyloxysilanes such as methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropyltriethoxysilane, γ-(β-glycidoxyethoxy)propyltrimethoxysilane, β-(3,4-epoxycyclohexyl)ethyltrimethoxysilane, β-(3,4-epoxycyclohexyl)-ethyltriethoxysilane, γ-methacryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β(aminoethyl)-γ-aminopropyltrimethoxysilane, β-cyanoethyltriethoxysilane and the like; and dialkoxysilanes and diacyloxysilanes such as dimethyldimethoxysilane, phenylmethyldimethoxysilane, dimethyldiethoxysilane, phenylmethyldiethoxysilane, γ-glycidoxypropylmethyldimethoxysilane, γ-glycidoxypropylmethyldiethoxysilane, γ-glycidoxypropylphenyldimethoxysilane, γ-glycidoxypropylphenyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, methylvinyldiethoxysilane and the like; and the hydrolyzates of the above mentioned compounds.

The organosilicon compounds represented by the formula (II), or the hydroxyzates thereof, usable as component B in the present invention are described below.

In the formula (II), $R^4$ represents an organic group having 1 to 5 carbon atoms. Example of such organic pgroups are alkyl group, alkenyl group, glycidoxy group and epoxy group. Y represents an organic group having 2 to 20 carbon atoms, examples of which are alkyl group, alkenyl group, aryl group, acyl group, halogen group, glycidoxy group, epoxy group, phenyl group and methacryloxy group.

Typical examples of the organosilicon compounds and the hydrolyzates thereof usable as component B are methylenebismethyldimethoxysilane, ethylenebisethyldimethoxysilane, propylenebisethyldiethoxysilane and butylenebismethyldiethoxysilane; and the hydrolyzates of these compounds.

In use of the organosilicon compounds serving as component A and component B in the present invention, either an organosilicon compound for component A or component B is used alone or an organosilicon compound for component A and an organosilicon compound for component B are used in admixture. Needless to say, it is possible to use two or more types of organosilicon compounds for component A and those for component B.

Hydrolysis of the organosilicon compounds used as component A and component B in the present invention can be accomplished by adding an acid solution such as hydrochloric acid solution, acetic acid solution, sulfuric acid solution or the like to an organosilicon compound or a mixture of organosilicon compounds for component A and/or component B and stirring the resulting solution.

The especially preferred examples of organosilicon compounds for use in the present invention are those specified for use as component A and comprising a mixture of a trialkoxysilane compound of the formula (I) wherein $R^2$ is an alkyl group having 1 to 4 carbon atoms, a is 1 and b is 0 and a dialkoxysilane compound of the formula (I) wherein $R^2$ is an alkyl group having 1 to 4 carbon atoms, a is 1 and b is also 1. The hard coating film formed by using this mixture is elevated in its crack initiation temperature.

The particles of tin oxide having a particle size of 1–100 m$\mu$ and coated with fine particles of tungsten oxide, which are employed as component C in the present invention, are used in the form of a colloidal solution prepared by dispersing said particles in water, an organic solvent or a mixed solvent. This component serves for enhancing refractive index and scuff or mar resistance of the hard coating film and further improving its hot water resistance and transparency. As the organic solvent used for dispersing the tin oxide fine particles coated with fine particles of tungsten oxide, there can be employed, for instance, alcohols such as methanol and ethanol.

The reason why the surfaces of the tin oxide particles are coated with the tungsten oxide particles in the present invention is as stated below. For obtaining a transparent hard coating film, it is essential that the fine particles of a metal oxide are uniformly dispersed without cohering or coagulating to each other. The fine particles of tin oxide are usually in a state of being charged positively. When mixing these tin oxide particles with a organosilicon compound, since said compound is in a state of being charged negatively, the tin oxide particles were apt to be dispersed non-uniformly and to cohere or coagulate to each other. In the present invention, in order to allow the tin oxide particles to be dispersed uniformly without impairing the normal properties of the tin oxide particles, these particles are coated with the negatively charged tungsten oxide particles. When the tin oxide particles coated with the negatively charged tungsten oxide particles are mixed with a negatively charged organosilicon compound or compounds for component A and/or component B such as mentioned above, said tin oxide particles and organosilicon compound repel each other, allowing uniform dispersion of said tin oxide particles, hence easier treatment or handling of the coating composition.

Simple mixing of tungsten oxide particles and tin oxide particles is undesirable since the tin oxide particles having a positive charge can not completely be coated with the tungsten oxide particles having a negative charge.

The particle size of the tin oxide particles used in this invention is defined to the range of 1 to 100 millimicrons, preferably 5 to 20 millimicrons. This is for the reason that the particles with a size less than 1 millimicron lacks stability and the hard coating film formed by using such particles proves poor in durability, whilst when the particle size exceeds 100 millimicrons, there arises the problem that the produced hard coating film may lack transparency.

The particle size of the tungsten oxide particles is preferably in the range of 0.1 to 30 millimicrons. The reason is that the particles with a size less than 0.1 millimicron lacks stability and the hard coating film formed by using such particles tends to prove unsatisfactory in durability, whilst when the particle size exceeds 30 millimicrons, the properties of tungsten oxide are emphasized, rendering the formed coating film apt to become unsatisfactory in hot water resistance.

The ratio by weight of the tungsten oxide particles to the tin oxide particles in the composition is preferably in the range of 0.005 to 0.5. This is because when said ratio is less than 0.005, cohesion or coagulation of particles tends to take place in the coating composition, while when said ratio exceeds 0.5, the properties of tungsten oxide particles become dominant, resulting in unsatisfactory hot water resistance of the produced coating film.

The "tin oxide particles coated with tungsten oxide particles" referred to in this specification means specifically the particles of the structure in which the tungsten oxide particles and the tin oxide particles are chemically or physically bonded to each other in such a state that the tungsten oxide particles cover the surfaces of the tin oxide particles.

Regarding the tin oxide particles coated with tungsten oxide particles, those having a refractive index (nd) of 1.82 to 1.86, a specific gravity of 1.095 to 1.115 at 25° C., a pH of 6.5 to 8.0 at room temperature and a viscosity of 10 or below at 25° C. are preferably used in the present invention.

The amount of the tin oxide particles coated with tungsten oxide particles used in the present invention is preferably so selected that the ratio of the solid amount of the tin oxide particles coated with tungsten oxide particles to the amount of an organosilicon compound or a hydrolyzate thereof in the composition would fall within the range of 0.02 to 5. This is for the reason that when said ratio is less than 0.02, the produced hard coating film is lowered in refractive index and greatly limited in scope of application to base materials whilst when said ratio is greater than 5, there arises the risk of causing cracking or other trouble between the coating film and base material as well as a possibility of reducing transparency of the film.

In the coating composition for forming a hard coating film according to this invention, a hardening agent may be blended for promoting the reaction and allowing hardening at a low temperature. Examples of the hardening agents usable for said purpose in this invention are amines such as allylamine and ethylamine; various types of metal salts of acids and bases such as Lewis acid and Lewis base, for example, metal salts of organic carboxylic acids, chromic acid, hypochlorous acid, boric acid, bromic acid, selenious acid, thiosulfuric acid, orthosilicic acid, thiocyanic acid, nitrous acid, aluminic acid, carbonic acid and the like; alcoholates of aluminum, zirconium, titanium and the like; and chelate compounds of these metal elements.

Also, in the coating composition for forming a hard coating film according to this invention, there may be contained one or more organic amines selected from the group consisting of monoethanolamine, diethanolamine, triethanolamine, ethylenediamine, diethylenetriamine, triethylenetetramine and tetraethylenepentamine and/or one or more organic acids selected from the group consisting of tartaric acid and citric acid for suppressing cohesion or coagulation of the tin oxide particles coated with tungsten oxide particles used as component C of the composition. The pH of the coating composition is adjusted to be in the range of 1 to 6 for prolonging the pot life of the coating composition.

Further, the coating composition for forming a hard coating film according to this invention may contain a particulate inorganic material of 1 to 300 millimicrons in particle size comprising an oxide of a metal such as aluminum, titanium, anitmony, zirconium, silicon, cerium and the like, in an amount not affecting the properties of said tin oxide particles coated with tungsten oxide particles, for coordinating refractive index with the lens used as base material and for further improving scuff or mar resistance of the produced coating film. The coating composition may be also added with various types of surface active agent for the purposes of improving flow characteristics during the coating operation and smoothness of the hard coating film. It is also possible to blend other additives such as ultraviolet absorbing agent, antioxidant, etc., so far as they give no adverse effect to the properties of the produced hard coating film.

For coating, any of the usually employed methods such as dipping, spin coating, spray coating, etc., can be used, but dipping or spin coating is preferred in view of surface precision and other aspects.

As the base material on which a hard coating film of this invention is to be formed, there can be mentioned, as a typical example, a plastic lens made from methyl methacrylate homopolymer, copolymer of methyl methacrylate and one or more of other monomers, diethylene glycol bisallyl carbonate homopolymer, copolymer of diethylene glycol bisallyl carbonate and one or more of other monomers, polycarbonate, polystyrene, polyvinyl chloride, polyethylene terephthalate, polyurethane or the like, and an inorganic glass lens.

Hardening of said coating composition can be accomplished by hot-air drying or irradiation with active energy rays, but it is preferred to perform hardening in hot air of 70° to 200° C., more preferably 90° to 150° C. Far infrared rays are a preferred example of said active energy rays and use of far infrared rays can minimize the risk of causing damage by heat.

Said coating composition, before applied to a base material may be subjected to an appropriate treatment such as a chemical treatment with an acid, alkali or various types of organic solvent, a physical treatment with plasma, ultraviolet rays, etc., a washing treatment using various types of detergent or a primer treatment using various types of resin, thereby improving adhesion of the hard coating film to the base material. An antireflection film may be applied on the hard coating film.

Further, the coating film of this invention can be formed as a high refractive index film to serve as an antireflection film, etc. It may also be provided with various functions such as anti-fogging, photochromic action, anti-fouling, etc., to serve as a multi-function film.

The optical element having a hard coating film according to this invention can be used as various optical articles such as lens for spectacles, lens for cameras, optical filter applied to a display of a word processor, window glass for automobiles, etc.

EXAMPLES

The present invention will hereinafter be described more particularly by showing examples thereof. It is to be understood, however, that these examples are merely intended to be illustrative and not to be construed as limiting the scope of the invention.

The properties of the plastic lenses having the hard coating films obtained in the Examples of this invention and in the Comparative Examples were determined according to the following methods.

(1) Scuff resistance test

The lens surface was rubbed with steel wool #0000 and the degree of resistance to scuffing was visually judged. Scuff resistance was evaluated according to the following criteria:

A: The lens surface is scarcely scuffed even when rubbed strongly.
B: The lens surface is scuffed to a notable degree when rubbed strongly.
C: The lens surface is scuffed equally to the base material.

(2) Presence or absence of interference fringe

Presence (the degree of visibility when present) or absence of interference fringe was visually judged under a fluorescent lamp. Judgement was made according to the following critera:

A: Interference fringe is scarcely seen.
B: Interference fringe is seen slightly.
C: Interference fringe is seen conspicuously.

(3) Adhesion test

Each test piece of hard coating film was crosscut to 100 sections at intervals of 1 mm, and an adhesive tape (a trademark "Cellotape" produced by Nichiban Co., Ltd.) was strongly stuck to the crosscut test film and then rapidly peeled off, examining occurrence or nonoccurrence of consequent separation of the cut section(s) of the film.

(4) Hot water resistance test

Each test piece was immersed in hot water of 45° C. for 5 hours and then subjected to the adhesion test.

(5) Transparency test

Clouding of the lens was visually examined under a fluorescent lamp in a dark room. Evaluation was made according to the following critera:

A: Clouding is scarcely admitted.
B: Clouding is admitted slightly.
C: Clouding is admitted evidently.

(6) Dyeability test 5 g of a disperse dye (a tradename "HOYA HARD SMOKE" produced by HOYA CORPORATION) was put into 1 liter of water and heated to 90° C. to prepare a dyeing solution. Each test lens having a hard coating film was immersed in this dyeing solution for 5 minutes and then luminous transmittance of the lens was measured. The lenses which were reduced more than 20% in luminous transmittance were indicated as "Good" (in dyeability) and those whose reduction in luminous transmittance was less than 20% were indicated as "Bad".

EXAMPLE 1

Preparation of coating solution 70 parts by weight of γ-glycidoxypropyltrimethoxysilane used as component A was supplied into a glass-made container equipped with a magnetic stirrer, followed by dropwise addition of 16 parts by weight of 0.1N hydrochloric acid with stirring. Thereafter, the mixture was stirred for 24 hours to obtain a hydrolyzate. Then, 105 parts by weight of a water-dispersed sol of tin oxide particles coated with tungsten oxide particles (solid content: 30%; average particle size: 15 mμ; refractive index (nd): 1.84; tungsten oxide particle size: 1 mμ) used as component C, 80 parts by weight of isopropyl alcohol, 80 parts by weight of ethyl cellosolve, both being used as solvent, 1 part by weight of a silicone type surface active agent used as lubricant, 1 part by weight of monoethanolamine used as stabilizer and 4 parts by weight of aluminum acetylacetonate used as hardening agent were added, and after sufficient stirring, the mixed solution was filtered to prepare a coating solution. The pH of the obtained coating solution was 1.

Formation of hard coating film

A plastic lens (refractive index nd: 1.56) composed of a terpolymer of diethylene glycol bisallyl carbonate, benzylmethacrylate and diallyl isophthalate was immersed in a 10% NaOH solution of 45° C. for 5 minutes. Then the lens, after washed and dried well, was subjected to dip coating by using said coating solution (pull-up rate: 14 cm/min) and heated at 130° C. for 2 hours to form a hard coating film. The obtained coated lens was subjected to various evaluation tests.

The plastic lens having a hard coating film obtained according to the above-described method had excellent scuff resistance, transparency, adhesiveness and hot water resistance and was substantially free of interference fringe as shown in Table 1.

EXAMPLE 2

The procedure of Example 1 was followed except that 70 parts by weight of β-(3,4-epoxycyclohexyl)ethyltrimethoxysilane was used in place of 70 parts by weight of γ-glycidoxypropyltrimethoxysilane as component A and that the plastic lens used was a plastic lens (nd: 1.60) made from a copolymer of 2,5-dimercaptomethyl-1,4-dithian, 1,3-bis(isocyanatemethyl)cyclohexane and pentaerythritol tetrakismercaptopropionate. The results of evaluation, as shown in Table 1, indicated the equally excellent properties of the obtained coated lens as that of Example 1.

EXAMPLE 3

The procedure of Example 1 was followed except that 70 parts by weight of methyltrimethoxysilane was used in place of 70 parts by weight of γ-glycidoxypropyltrimethoxysilane as component A and that 4 parts by weight of sodium acetate was used in place of 4 parts by weight of aluminum acetylacetonate as hardening agent. The results of evaluation, as shown in Table 1, confirmed the excellent properties of the obtained lens as that of Example 1.

EXAMPLE 4

The procedure of Example 1 was followed except that 45 parts by weight of γ-glycidoxypropyltrimethoxysilane and 25 parts by weight of γ-glycidoxypropylmethyldimethoxysilane were used as component A. The results of evaluation, as shown in Table 1, indicated the excellent properties of the obtained coated lens as that of Example 1.

EXAMPLE 5

The procedure of Example 1 was followed except that 25 parts by weight of methanol-dispersed colloidal silica (solid content: 30%; average particle size: 15 m) was used along with 290 parts by weight of water-dispersed sol of tin oxide particles coated with tungsten oxide particles (solid content: 30%; average particle size: 15 mμ) as component C. As seen from the results of evaluation shown in Table 1, the obtained coated lens had excellent properties as that of Example 1.

EXAMPLE 6

The plastic lens having a hard coating film obtained in Example 1 was further provided with an anti-reflection film, and the various properties of the lens were determined according to the evaluation tests described above. The anti-reflection film was formed in the manner described below.

The plastic lens having a hard coating film obtained in Example 1 was placed in a deposition vessel and heated to 85° C. while evacuating the vessel. After the vessel was evacuated to $2\times10^{-5}$ Torr, the deposition materials were deposited on the lens surface by the electron beam heating method to form a 0.6λ thick primary (foundation) coat of $SiO_2$ and, on said primary coat, a low refractive index layer consisting of a hybride layer (nd=2.05; nλ=0.075λ) composed of $Ta_2O_5$, $ZrO_2$ and $Y_2O_3$ and an $SiO_2$ layer (nd=1.46: nλ=0.056λ); a high refractive index layer (nd=2.05; nλ=0.46λ) composed of $Ta_2O_5$, $ZrO_2$ and $Y_2O_3$; and another low refractive index layer of $SiO_2$ (nd=1.46; nλ=0.25λ). The properties of the resulting product were evaluated according to the method of Example 1. The results of evaluation, as shown in Table 1, ascertained the product to be an optical element excellent in scuff resistance, adhesiveness and other properties.

EXAMPLE 7

The procedure of Example 1 was followed except that 55 parts by weight of methylenebistrimethoxysilane, a material designated as component B in this invention, was used in place of 170 parts by weight of γ-glycidoxypropyltrimethoxysilane, a material designated as component A. The results of evaluation, as shown in Table 1, indicated the obtained lens had the excellent properties as that of Example 1.

EXAMPLE 8

The procedure of Example 1 was followed except that 25 parts by weight of methylenebistrimethoxysilane (a material designated as component B) was used together with 30 parts by weight of γ-glycidoxypropyltrimethoxysilane, a component A material. From the results of evaluation shown in Table 1, the obtained lens was confirmed to have the excellent properties as the lens obtained in Example 1.

COMPARATIVE EXAMPLE 1

A plastic lens having a hard coating film was obtained by following the same process as Example 1 except that the tin oxide particles coated with tungsten oxide particles were not used. As noted from the evaluation results shown in Table 2, the obtained lens bore distinctly visible interference fringes and was poor in hot water resistance.

COMPARATIVE EXAMPLE 2 AND 3

The plastic lenses having a hard coating film were obtained by following the procedure of Example 1 except that 105 parts by weight of silicon oxide particles (Comparative Example 2) or 105 parts by weight of tungsten oxide particles (Comparative Example 3) were used in place of 105 parts by weight of tin oxide particles coated with tungsten oxide particles. As seen from the evaluation results shown in Table 2, the plastic lenses having a hard coating film obtained in Comparative Examples 2 and 3 were unsatisfactory in scuff resistance, interference fringe and hot water resistance.

TABLE 1

| Example No. | Component A | Component B | Component C | Base material | Anti-reflection film | Scuff resistance | Interference fringe | Adhesiveness | Hot water resistance | Transparency | Dyeability |
|---|---|---|---|---|---|---|---|---|---|---|---|
| 1 | γ-G$_1$*[1] | — | W on Sn*[6] | Plastic lens (I)*[8] | None | A | A | Good | Good | A | Good |
| 2 | β-E*[2] | — | W on Sn*[6] | Plastic lens (II)*[9] | " | A | A | Good | Good | A | Good |
| 3 | MT*[3] | — | W on Sn*[6] | Plastic lens (I)*[8] | " | A | A | Good | Good | A | Good |
| 4 | γ-G$_1$*[1] + γ-G$_2$*[4] | — | W on Sn*[6] | " | " | A | A | Good | Good | A | Good |
| 5 | γ-G$_1$*[1] | — | W on Sn*[6] + Si*[7] | " | " | A | A | Good | Good | A | Good |
| 6 | γ-G$_1$*[1] | — | W on Sn*[6] | " | Applied | A | A | Good | Good | A | Good |
| 7 | — | MB*[5] | W on Sn*[6] | " | None | A | A | Good | Good | A | Good |
| 8 | γ-G$_1$*[1] | MB*[5] | W on Sn*[6] | " | " | A | A | Good | Good | A | Good |

*[1] γ-G$_1$: γ-glycidoxypropyltrimethoxysilane
*[2] β-E: β-(3,4-epoxycyclohexyl)ethyltrimethoxysilane
*[3] MT: methyltrimethoxysilane
*[4] γ-G$_2$: γ-glycidoxypropylmethyldimethoxysilane
*[5] MB: methylenebistrimethoxysilane
*[6] W on Sn: tin oxide particles coated with tungsten oxide particles
*[7] Si: silica (silicon oxide)
*[8] Plastic lens (I): diethylene glycol bisallyl carbonate/benzyl methacrylate/diallyl isocyanate terpolymer
*[9] Plastic lens (II): 2,5-dimercaptomethyl-1,4-dithian/1,3-bis(isocyanatemethyl)cyclohexane/pentaerythritol tetrakismercaptopropionate terpolymer

TABLE 2

| Comparative Ex. No. | Component A | Component B | Particle | Base material | Anti-reflection film | Scuff resistance | Interference fringe | Adhesiveness | Hot water resistance | Transparency | Dyeability |
|---|---|---|---|---|---|---|---|---|---|---|---|
| 1 | γ-G$_1$*[1] | — | — | Plastic lens (I)*[8] | None | B | C | Good | Bad | A | Bad |
| 2 | γ-G$_1$*[1] | — | Si*[7] | " | " | A | C | Good | Good | A | Bad |
| 3 | γ-G$_1$*[1] | — | W*[10] | " | " | B | A | Good | Bad | A | Good |

*[1], *[7], *[8]: See footnotes in Table 1.
*[10] W: tungsten oxide

As described above, the present invention has made it possible to provide a hard coating film made from a coating composition using the fine particles of tin oxide which were made incohesive to each other without being impaired in their specific properties, and the optical elements having such a hard coating film. The hard coating film according to this invention is especially excellent in hot water resistance and transparency and finds particularly useful application to lenses for spectacles.

What is claimed is:

1. A coating film on a substrate formed by hardening a coating composition containing component C and component A or component B or components A, B and C, wherein component A is: an organosilicon compound or a hydrolyzate thereof, said organosilicon compound being represented by the formula (I):

$$(R^1)_a(R^3)_b Si(OR^2)_{4-(a+b)} \quad (I)$$

wherein $R^1$ and $R^3$ are each an organic group containing therein at least one member selected from the group consisting of an alkyl group, alkenyl group, aryl group, acyl group, halogen group, glycidoxy group, epoxy group, amino group, mercapto group, methacryloxy group and cyano group; $R^2$ is a member selected from the group consisting of alkyl group having 1 to 8 carbon atoms, alkoxy group having 1 to 8 carbon atoms, acyl group having 1 to 8 carbon atoms and phenyl group; and a and b are each integers of 0 or 1;

component B is: an organosilicon compound or a hydrolyzate thereof, said organosilicon compound represented by the formula (II):

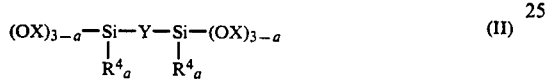

$$(OX)_{3-a}-\underset{R^4_a}{Si}-Y-\underset{R^4_a}{Si}-(OX)_{3-a} \quad (II)$$

wherein $R^4$ is an organic group having 1 to 5 carbon atoms; X is an alkyl group having 1 to 4 carbon atoms or an acyl group having 1 to 4 carbon atoms; Y is an organic group having 2 to 20 carbon atoms; and a is an integer of 0 or 1 and;

component C is: particles of tin oxide having a particle size of 0.1 to 30 millimicrons and coated with fine particles of tungsten oxide in a weight ratio of tungsten oxide particles to tin oxide particles of 0.005 to 0.5 wherein the amount of solid portion of the tin oxide particles coated with the tungsten oxide particles is in the range of 0.02 to 5 parts to 1 part of the organosilicon compound or a hydrolyzate thereof used as component A, component B or both component A and component B.

2. A coating film according to claim 1, wherein the organosilicon compound used as component A is a mixture of a trialkoxysilane compound of the formula (I) wherein $R^2$ is an alkyl group having 1 to 4 carbon atoms, a is 1 and b is 0, with a dialkoxysilane compound of the formula (I) wherein $R^2$ is an alkyl group having 1 to 4 carbon atoms, a is 1 and b is also 1.

3. A coating film according to claim 1, wherein the surfaces of the tin oxide particles coated with the tungsten oxide particles are negatively charged.

4. A coating film according to claim 1, wherein said coating composition further contains particles of a metal oxide selected from the group consisting of silicon oxide, antimony oxide, titanium oxide, cerium oxide, aluminum oxide and zirconium oxide.

5. A coating film according to claim 1, wherein said coating composition further contains one or more of organic amines selected from the group consisting of monoethanolamine, diethanolamine, triethanolamine, ethylenediamine, diethylenetriamine, triethylenetetramine and tetraethylenepentamine.

6. A coating film according to claim 1, wherein said coating composition contains one or more of organic acids selected from the group consisting of tartaric acid, citric acid and amino-acids.

7. A coating film according to claim 1, wherein the pH of said coating composition is in the range of 1 to 6.

8. A coating film according to claim 1, wherein said coating composition contains one or more of hardening catalysts selected from the group consisting of metal alkoxides, metal chelates and metal salts.

9. An optical element having a coating film which comprises a base material and a coating film provided thereon, said coating film formed by hardening a coating composition containing component C and component A or component B or components A and B and C, which are specified below, wherein component A is: an organosilicon compound or a hydrolyzate thereof, said organosilicon compound being represented by the formula (I):

$$(R^1)_a(R^3)_b Si(OR^2)_{4-(a+b)} \quad (I)$$

wherein $R^1$ and $R^3$ are each an organic group containing therein at least one member selected from the group consisting of an alkyl group, alkenyl group, aryl group, acyl group, halogen group, glycidoxy group, epoxy group, amino group, mercapto group, methacryloxy group and cyano group; $R^2$ is a member selected from the group consisting of alkyl group having 1 to 8 carbon atoms, alkoxy group having 1 to 8 carbon atoms, acyl group having 1 to 8 carbon atoms and phenyl group; and a and b are each integers of 0 or 1;

component B is: an organosilicon compound or a hydrolyzate thereof, said organosilicon compound represented by the formula (II):

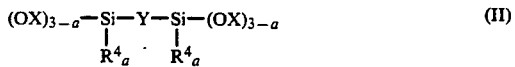

$$(OX)_{3-a}-\underset{R^4_a}{Si}-Y-\underset{R^4_a}{Si}-(OX)_{3-a} \quad (II)$$

wherein $R^4$ is an organic group having 1 to 5 carbon atoms; X is an alkyl group having 1 to 4 carbon atoms or an acyl group having 1 to 4 carbon atoms; Y is an organic group having 2 to 20 carbon atoms; and a is an integer of 0 or 1; and component C is: particles of tin oxide having a particle size of 0.1 to 30 millimicrons and coated with fine particles of tungsten oxide in a weight ratio of tungsten oxide particles to tin oxide particles of 0.005 to 0.5 wherein the amount of solid portion of the tin oxide particles coated with the tungsten oxide particles is in the range of 0.02 to 5 parts to 1 part of the organosilicon compound or a hydrolyzate thereof used as component A, component B or both component A and component B.

10. An optical element having a coating film according to claim 9, wherein the organic silicon compound used as component A of the coating composition is a mixture of a trialkoxysilane compound of the formula (I) wherein $R^2$ is an alkyl group having 1 to 4 carbon atoms, a is 1 and b is 0, with a dialkoxysilane compound of the formula (I) wherein $R^2$ is an alkyl group having 1 to 4 carbon atoms, a is 1 and b is also 1.

11. An optical element having a coating film according to claim 9, wherein the tin oxide particles coated with the tungsten oxide particles, used as component C, are negatively charged on their surfaces.

12. An optical element having a coating film according to claim 9, wherein the base material is a lens for spectacles.

13. An optical element having a coating film according to claim 9, wherein an anti-reflection film is formed on said hard coating film.

* * * * *